United States Patent [19]

Wahle et al.

[11] Patent Number: 5,006,621
[45] Date of Patent: Apr. 9, 1991

[54] CO-POLYMERS OF LONG CHAIN ALKYL ACRYLATES WITH N-CONTAINING OLEFINS AND THEIR USE AS FLOW IMPROVERS FOR CRUDE OILS

[75] Inventors: Bernd Wahle, Kaarst; Claus-Peter Herold, Mettmann; Wolfgang Zoellner, Duesseldorf; Ludwig Schieferstein, Ratingen; Doris Oberkobusch, Duesseldorf, all of Fed. Rep. of Germany

[73] Assignee: Henkel Kommanditgesellschaft auf Aktien, Duesseldorf, Fed. Rep. of Germany

[21] Appl. No.: 326,598

[22] Filed: Mar. 21, 1989

[30] Foreign Application Priority Data

Mar. 21, 1988 [DE] Fed. Rep. of Germany ....... 3809418

[51] Int. Cl.$^5$ .............................................. C08F 22/40
[52] U.S. Cl. ...................................... 526/262; 526/312
[58] Field of Search ................................. 526/262, 312

[56] References Cited

U.S. PATENT DOCUMENTS

| Re. 30,238 | 3/1980 | Specht et al. | 44/62 |
| 3,854,893 | 12/1974 | Rossi | 44/62 |
| 3,868,231 | 2/1975 | Van de Kraats et al. | 44/62 |
| 3,957,659 | 5/1976 | van de Kraats et al. | 252/8.3 |
| 4,284,414 | 8/1981 | Bryant | 44/62 |
| 4,481,013 | 11/1984 | Tack et al. | 44/62 |
| 4,532,332 | 7/1985 | Muller | 526/262 |
| 4,663,491 | 5/1987 | Barthell et al. | 585/3 |

FOREIGN PATENT DOCUMENTS

| 0105529 | 3/1917 | United Kingdom . |
| 2058825 | 4/1981 | United Kingdom . |
| 2125805 | 3/1984 | United Kingdom . |

*Primary Examiner*—Joseph L. Schofer
*Assistant Examiner*—Alex H. Walker
*Attorney, Agent, or Firm*—Ernest G. Szoke; Wayne C. Jaeschke; John E. Drach

[57] ABSTRACT

Copolymers of long-chain alkyl acrylates or methacrylates of the formula $$CH_2=CR^1-CO-OR^2 \qquad (I)$$

in which $R^1$ is a hydrogen atom or a methyl group and $OR^2$ is a fatty alcohol radical with 16 to 34 carbon atoms and nitrogen-containing olefins can be used as flow improvers for crude oils.

15 Claims, No Drawings

CO-POLYMERS OF LONG CHAIN ALKYL ACRYLATES WITH N-CONTAINING OLEFINS AND THEIR USE AS FLOW IMPROVERS FOR CRUDE OILS

BACKGROUND OF THE INVENTION

1. Field of the Invention

This invention relates to copolymers of long-chain alkyl acrylates with N-containing olefins, the process for their production and their use as flow improvers for crude oils.

2. Description of the Related Art

Depending on their respective origin, crude oils can contain considerable amounts of paraffins. When cooled below a certain temperature (cloud point) the paraffin gradually crystallizes out of the oil and forms a three-dimensional network of scales and/or needles which is filled with oil. Such a structure gives the crude oil disadvantageous properties with respect to flowability and ease of handling.

The effect of the paraffin crystallizing out in the crude oil is that the oil scarcely or no longer flows, it can no longer be pumped or only with a great expenditure of energy and forms deposits in the pipelines, storage containers and ships tanks, which lead to considerable losses in production and capacity.

Crude oils found in oil-bearing layers have a temperature which varies according to depth. In the deeper layers from which the oil is extracted, higher temperatures prevail at which the paraffin is still fluid and dissolved in the oil. If crystallisation inhibitors are added to a crude oil containing paraffin in this state, the effect is on the one hand to lower the solidification point, and on the other hand to alter the crystal structure of the separated paraffin with improvement of the flow properties of the crude oil.

As a measure of the effect of a flow improver the solidification point or the lowering of the solidification point in comparison to the crude oil without flow improvers is given in °C. It is in this sense possible to speak of pour-point depressants, PPDs, as well as flow improvers.

In the prior art a number of compounds with a crystallisation inhibiting effect are described, see DE-OS 2,926,474, 3,237,308, 3,226,252, 2,210,431; EP-OS 61, 894; U.S. Pat. Nos. 4,663,491, 4,284,414, 3,957,659, 3,854,893. Usually these are co-polymers of $C_{16}C_{24}$ methacrylates with short chain methacrylates, aminoalkylmethacrylates as well as various olefins with or without polar groups. The $C_{16}C_{24}$-alcohols characteristically represent the usual cuts of the product from untreated or petrochemical raw materials.

A special position is held by a commercial product, which is used for comparison purposes in the following and is therefore described as a "comparative product" and can be used in many different crude oils as a flow improver. The exact structure of this product is not known, presumably it is one of the co-polymers described in U.S. Pat. Nos. 3,957,659 and 3,868,231 of (a) a $C_{16}C_{24}$-acrylate and (b) 4-vinylpyridine.

The two comonomers have very different copolymerization parameters (acrylic acid octyl ester:$v_1$ approximately 0.1: 4-vinylpyridine:$v_2$ approximately 1.6). They are therefore difficult to co-polymerize and require special measures (e.g. a programmed "Monomer Addition Procedure") in the products.

DESCRIPTION OF THE INVENTION

Other than in the operating examples, or where otherwise indicated, all numbers expressing quantities of ingredients or reaction conditions used herein are to be understood as modified in all instances by the term "about".

The present invention relates to co-polymers of long-chain alkyl acrylates with N-containing olefins, which because of the acrylate structure present in both monomers are distinctly easier to co- polymerize and are particularly suitable as flow improvers for crude oils. The copolymers of the present invention are comprised of units of: (1) an acrylate of the formula I

wherein $R^1$ is hydrogen or methyl, and $R^2$ is a linear or branched, saturated or unsaturated aliphatic radical having from 16 to 34 carbon atoms, and (2) N containing olefins selected from the group consisting of (A) a compound of the formula II

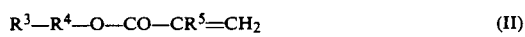

wherein $R^3$ is a cyclic imide having of the formula III or IV

wherein $R^5$ is hydrogen or methyl, $R^6$ and $R^7$ are together or separately hydrogen or $C_1$-$C_4$-alkyl groups or when taken together are ring fragments of an unsubstituted or a $C_1$-$C_4$ alkyl substituted ring have 5 or 6 carbon atoms, $R^4$ is (a) a straight-chain or branched alkylene group having 1 to 12 carbon atoms optionally substituted with —OH or $NH_2$ group, (b) a straight-chain or branched alkylene group having 1 to 12 carbon atoms containing the $-CH_2-CH_2-O-CH_2-CH_2-$ or $-CH_2-CH_2-NH-CH_2-CH_2-$ moiety when the alkylene group contains at least 4 carbon atoms, (c) a cyclic $C_5$- or $C_6$-alkylene group or (d) a $C_1$-$C_4$-alkylene- substituted phenylene group, (B) a compound of formula V

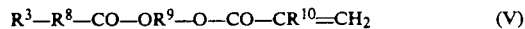

wherein $R^3$ is a cyclic imide having of the formula III or IV

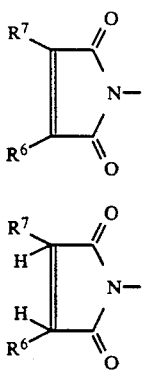

wherein $R^6$ and $R^7$ are together or separately hydrogen or $C_1$-$C_4$alkyl groups or when taken together are ring fragments of an unsubstituted or a $C_1$-$C_4$alkyl substituted ring having 5 or 6 carbon atoms, $R^9$ is $C_2$-$C_{10}$alkylene group, $R^{10}$ is hydrogen or methyl, $R^8$ is a phenylene radical or an alkylene group of the formula $R^{20}$-CH- wherein $R^{20}$ is a hydrogen atom or a branched alkyl radical having from 1 to 11 carbon atoms, and $R^9$ is a $C_2$-$C_{10}$-alkylene group, (C) a compound of formula VI

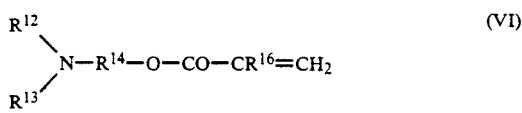

wherein $R^{16}$ is hydrogen or methyl, $R^{12}$ is a phenyl or benzyl group, $R^{13}$ is a $C_1$-$C_{16}$-alkyl group and $R^{14}$ is a $C_2$-$C_6$-alkylene group, (D) a compound of formula VII

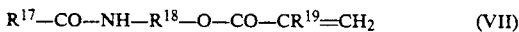

wherein $R^{19}$ is hydrogen or methyl, $R^{17}$ $C_7$-$C_{33}$-alkyl group, $R^{18}$ is a $C_2$-$C_4$-alkylene group or combinations thereof in molar ratios of I, to II, V, VI or VII of from about 1:0.1 to about 1:10.

Individual olefins of formula II, V, VI, VII or also mixtures of these olefins can be used in the co-polymerization.

The acrylates of formula I represent fatty acid esters of acrylic and methacrylic acids; the derivatives of acrylic acid are preferred. The alcohol component of the acrylates of formula I is formed by alcohols with 16 to 34 carbon atoms, in particular cetyl-, stearyl-, arachidyl-, behenyl- and lignoceryl-alcohol, in which special industrial $C_{18}/C_{22}$ fatty alcohol mixtures with behenyl alcohol contents of above 40% to above 70% are particularly preferred.

In the acrylates of formula II, $R^1$, defined as above, is preferably hydrogen. The groups $R^6$ and $R^7$ can be hydrogen or $C_1$-$C_4$-alkyl groups such as methyl, ethyl, n-propyl, i-propyl, n-butyl, s-butyl and t-butyl; they can also form a $C_5$ or $C_6$ ring such as cyclopentane, cyclopentene, benzene, 1,4-dihydrobenzene, cyclohexene, or such a ring substituted with the $C_1$-$C_4$-alkyl group. The group of N-containing olefins according to formula II, as well as the group of formula V is preferably selected from the group formed by the radicals of phthalimide, tetrahydro-phthalimide, methyl-tetrahydro- phthalimide, maleinimide and succinimide; special examples of phthalic acid derivatives, in addition to phthalimide and hexahydro-phthalimide, are 1,2,3,6-tetrahydro-phthalimide, 4-methyl-1, 2,3,6-tetrahydro- phthalimide and 4-methylhexahydro-phthalimide.

The group $R^4$ in the formula II represents a straight-chain or branched alkylene group with 1 to 12, and in particular 1 to 6, carbon atoms, in particular ethylene, propylene, butylene, pentylene, hexylene, octylene, decylene and dodecylene; the aforementioned alkylene groups with 1 to 6 carbon atoms are preferred. The group $R^4$ can also be phenylene or $C_1$-$C_4$-alkylene-substituted phenylene, in particular methylene-phenylene. The N-acrylates of formula II are preferably obtained when the corresponding cyclic anhydrides of the formula

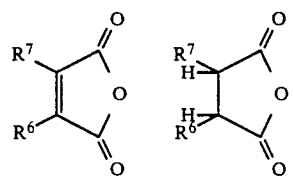

are reacted with aminoalcohols of the formula $$H_2N-R^5-OH$$

particular with amino-ethanol, omega-amino-propanol, -butanol, pentanol, -hexanol, -octanol, -decanol, -dodecanol, 1-amino-2-propanol, 4-hydroxyethyl- or 4-hydroxymethyl-aniline, 4-aminocyclohexanol. The reaction then takes place of the free OH-groups of the compounds thus obtained with acrylic or methacrylic acids or with reactive derivatives of these by the usual methods.

Other aminoalcohols can be used in this reaction e.g. 1-amino-2- hydroxypropane, 2-amino-1-hydroxypropane, 2-amino-2'-hydroxy- diethylether, 2-amino-2'-hydroxy-diethylamine and 2-amino-1-hydroxybutane as well as 1-amino-2,2-dimethyl-3-hydroxypropane.

Another preparation process for N-containing olefins of the general formula II, involves starting with the appropriate N-unsubstituted cyclic imides and reacting these with formaldehyde; the N-hydroxymethyl compounds obtained can then be esterified in the usual manner with reactive derivatives of acrylic and methacrylic acids.

In the N-containing olefins of formula V, in which $R^{10}$ is hydrogen or methyl, $R^3$ is a cyclic imide radical are defined as above, the $R^8$ group means a phenylene radical or an alkylene group with 1 to 12 carbon atoms, with the proviso that the alkylene radical has the structure

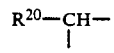

where $R^{20}$ is a hydrogen atom or a possibly branched alkyl radical with 1 to 11 carbon atoms. Compounds in which the radical $R^8$ is a methylene group or a $C_1$-$C_5$-mono-alkyl-substituted methylene group are preferred here. The meanings for the $C_1$-$C_5$-alkyl substituents are the same as given above for $C_1$-$C_4$, but including pentyl.

N-containing olefins of formula V can be obtained by reacting the appropriate cyclic anhydrides initially with amino acids of the general formula $$H_2N-R^8-COOH$$

Suitable amino acids are glycine, alanine, valine, leucine, isoleucine, phenylalanine, caprolactam and the like, and glycine is preferred. Another suitable amino acid is 4-amino benzoic acid. The imidocarboxylic acids thus obtained can then be reacted in the usual manner with hydroxy-$C_2$-$C_{10}$-alkyl-acrylates and -methacrylates, in particular $C_2$-$C_4$-alkyl acrylates, and -methacrylates; particularly preferred here is the reaction with the hydroxyethyl derivatives of the aforementioned acrylic acids.

In the N-containing olefins of formula VI, $R^{12}$ is a phenyl or benzyl group, $R^{13}$ is a $C_1$-$C_{16}$-alkyl group, preferably a $C_1$-$C_4$-alkyl group, and $R^{14}$ is a $C_2$-$C_6$-alkyl group, preferably a $C_2$-$C_4$-alkyl group. Alternatively, $R^{12}$ and $R^{13}$ could also be $C_1$-$C_{16}$-alkyl groups, preferably $C_1$-$C_4$-alkyl groups with the above meanings $R^{14}$ could be a phenylene group.

N-containing olefins of formula VI can be obtained, by reacting hydroxyalkyl amines of the formula $$R^{12}R^{13}N-R^{14}-OH$$

with acrylic or methacrylic acids or esters or reactive derivatives of the acids in the usual manner. As particularly advantageous hydroxyalkyl amines those are used, in which $R^{12}$ is a phenyl or benzyl group, $R^{13}$ is a $C_1$-$C_4$-alkyl group and the hydroxyalkyl group has 2 to 4 carbon atoms; alternatively $R^{12}$ and $R^{13}$ can be $C_1$-$C_4$-alkyl groups, where a hydroxyphenyl group takes the place of the hydroxyalkyl group. Particularly preferred representatives of the N-containing olefins of formula VI are those in which $R^{12}$ is benzyl or phenyl, $R^{13}$ is methyl or ethyl and $R^{14}$ is an alkylene radical with 2 to 6 carbon atoms. They are obtained starting from the following hydroxy alkyl amines:

N-benzyl-N-methyl-hydroxy-ethylamine, -propylamine, -butylamine, -pentylamine, -hexylamine, as well as the corresponding N-benzyl-N- ethyl-, N-phenyl-N-methyl- and N-phenyl-N-ethyl-N-hydroxy alkylamine.

In the N-containing olefins of formula VII, $R^{17}$ is a $C_7$-$C_{33}$-alkyl group, in particular a $C_{15}$-$C_{23}$-alkyl group. The radical $R^{17}$-CO is therefore the radical of a $C_8$-$C_{34}$-, in particular of a $C_{16}$-$C_{24}$-fatty acid or an industrial mixture of these from natural, e.g. of vegetable, animal or marine animal or synthetic origin. Typical examples of these fatty acids are caprylic, caprinic, lauric, myristic, palmitic, stearic, arachic, behenic, and montanic acid, and also lauroleic, myristoleic, palmitoleic, oleic and erucic acid. The N-containing olefins of the formula VII can be obtained by the reaction of the corresponding fatty acids or fatty acid mixtures with $C_2$-$C_4$-alkanolamines to the corresponding fatty alkanol amides and the acylation of the hydroxyl function in the usual manner with reactive derivatives of acrylic or methacrylic acid.

The reaction of acrylates of formula I with N-containing olefins II, V, VI and VII takes place in the presence of inert organic solvents such as xylene, tetraline and other solvents with higher boiling points, e.g. solvents high in aromatic substances, such as Solvesso 200, and in the presence of radical polymerization initiators, which are usual for the co-polymerization of acrylates, cf. Kirk-Othmer, Volume 13, 1981, pp 355 to 373; a preferred initiator is for example azo-isobutyro-dinitrile (AIBN). The co-polymerization usually takes place at temperatures of approximately 80° to 100° C.

Co-polymers of the type mentioned in the introduction have also proved particularly advantageous, which by the co-polymerization of acrylates of formula I $$CH_2=CH-CO-OR^2 \qquad (I)$$

in which $OR^2$ is a fatty alcohol radical with 16 to 24 carbon atoms, in particular an industrial fatty alcohol mixture which is high in behenyl alcohol (content of behenyl alcohol of more than 40 to more than 70%), with an N-containing olefin of formula II in which $R^3$ is defined as above and $R^4$ is an alkylene radical with 2 to 8, and in particular 2 to 3 carbon atoms, in molar ratios of the compounds VI to II of from about 1:0.5 to about 1:2. Copolymers of the type mentioned in the introduction have proved particularly advantageous, which by the copolymerization of an acrylate of formula I, in which the group $OR^2$ is a fatty alcohol radical with 16 to 24 carbon atoms, in particular an industrial fatty alcohol mixture which is high in behenyl alcohol (behenyl alcohol content of more than 40 to more than 70%), with an N-containing olefin of formula VI in which $R^{13}$ is a $C_1$-$C_4$-alkyl group and $R^{14}$ is an ethylene group, in molar ratios of the compounds I to VI of from about 1:0.1 to about 1:0.5.

Furthermore the invention relates to a process for preparation of copolymers of the type mentioned in the introduction, as well as their use as flow improvers for paraffin-rich crude oils. In using the copolymers as flow improvers for paraffin-rich crude oil, the copolymers can be dissolved directly in the crude oil or can first be dissolved in an aromatic hydrocarbon solvent such as toluene or xylene and the resulting solution dissolved in the crude oil to faciliatate their inclusion in the crude oil. The quantity of coplymers dissolved in the crude oil varies with the particular type of crude oil. The copolymers are usually incorporated into crude oil at a level of from about 100 ppm to about 3000. The preferred amount is from about 150to about 2000 ppm.

The N-containing olefins used to prepare the copolymers of the present invention are prepared by the following processes.

1. Preparation of N-containing olefins of the general formulae II, V, VI, and VII (starting compounds for the copolymerization=N-containing olefins A to M).

In the following table 1 the prepared N-containing olefins, A to H are summarized with their starting compounds and their physical characteristics. They are obtained starting from the corresponding anhydrides in a two-stage synthesis using the hydroxyimides according to the following general method:

(a) Hydroxyimide Synthesis 1 mole of the amino alcohol is slowly added in drops to 1 mole of the appropriate anhydride in 400 ml xylene, during which the mixture heats up. After the addition is completed it is heated to 170° C. and the reaction water is distilled off azeotropically to the water separator. After approximately 3 hours the dehydration is complete. The product can be isolated by removal of the solvent or further reacted directly in solution.

TABLE 1

Olefins containing N from anhydrides, amino alcohols and acrylic acids.

| Anhydride | Hydroxyimide-Synthesis Amino alcohol | Yield[1] % | m.p. °C. | OHZ[2] | Product | Reaction with acrylic acid Yield % | m.p. °C. | N-olefin |
|---|---|---|---|---|---|---|---|---|
| phtalic acid anhydride | 2-aminoethanol | 98 | 127 | — | (phthalimido-N-ethyl)-acrylate | 92 | 105 | A |
| Tetrahydrophthalic acid anhydride | " | 100 | 70 | — | (tetrahydrophthal-imido-(N-ethyl)-acrylate | 89 | liquid | B |
| 4-methylhexahydro-phthalic acid anhydride | " | 98 | — | 259 | (4-methylhexahydro-phthalimido-N-ethyl) acrylate | 91 | liquid | C |
| Succinic acid anhydride | " | 97 | 60 | | (Succimido-N-ethyl)-acrylate | 50 | | D |
| phthalic acid anhydride | 1-aminopropanol-2 | 97 | 88 | | (phthalimido-N-iso-propyl)-acrylate | 85 | 65 | E |
| phthalic acid anhydride | 2-(4-aminophenyl)-ethanol | 94 | | 201 | [phthalimido-N-(4-ethyl-phenyl)] | 89 | 105 | F |
| 4-Methylhexa-hydro-phthalic acid-anhydride | 6-aminohexanol-(1) | 100 | | 201.5 | (4-methylhexahydro-phthalimido-N-hexyl)-acrylate | 90 | liquid | G |
| succinic acid anhydride | " | 96 | | 252 | (Succinimido-N-hexyl)-acrylate | 74 | | H |

[1]calculated by the water collected
[2]OHZ - hydroxy number in mg KOH/g substance (b) Reaction of the hydroxyimides obtained above with acrylic acid to the N-containing olefins, A to H.

1 mole of the respective hydroxyimide is heated with 1 mole of acrylic acid in 200 ml of xylene with the addition of 1 g of hydroquinone monomethylether and 1 g of concentrated sulfuric acid in the water separator to approximately 140 to 150° C., until approximately the theoretical amount of water is removed. The product can be used directly for polymerization or can be isolated after washing with water and bicarbonate solution and removal of the xylene.

2. Preparation of further N-containing olefins. I, J, K, L, and M.

(Phthalimido-N-methyl)acrylate (I).

100 g phthalimide (0.68 mole) is added to 88 ml of 37% formaldehyde solution and 190 ml of distilled water and stirred for 4 hours at 98° C. The slightly cloudy solution is filtered while hot. During cooling the intermediate product, (N-hydroxymethyl)-phthalimide is precipitated as a white, crystalline solid. m.p. 104° C.

For the preparation of the title compound, 1 mole of (N-hydroxymethyl)- phthalimide and 1 mole of acrylic acid are put in 600 ml of xylene and after the addition of 1 g of hydroquinone monomethylether and 1 g of concentrated sulfuric acid it is esterified at approximately 140° C. until no more reaction water is formed. The remaining product after the removal of the solvent has a m.p. of 115° C.

Phthalimido-N-(methylcarboxyethyl)-acrylate (J).

N-(phthaloylglycine):

1 mole of phthalic acid anhydride, 1 mole of glycine and 0.1 mole of triethylamine are heated in the water separator in 200 ml of toluene to approximately 110° to 130° C. Thereby over 3 hours approximately 95% of the theoretical water quantity is separated. The solvent is removed at a maximum of 140° C. in a vacuum. The solid residue is triturated in 300ml of 0.5 n HCl, suction-filtered, washed several times with water and dried. A white product is obtained, m.p. 190° C.

Conversion of N-phthaloylglycine to N-containing olefin J.

41.0 g (0.2 mole) N-phthaloylglycine and 69.9 g (0.6 mole) of hydroxyethyl acrylate are heated in 200 ml of toluene with the addition of 0.6 g hydroquinone monomethylether and 0.6 g of concentrated sulfuric acid in the water separator; the internal temperature amounts to 110° to 130° C. After 3.5 g of water has been separated, (theoretical value 3.6 g) which corresponds to a conversion of approximately 97%, the reaction is interrupted (after approximately 3.5 hours). After diluting with a further 200 ml of toluene the excess hydroxyethyl acrylate is removed by washing with water. The reaction mixture is then neutralized with bicarbonate and the solvent removed, whereby the product precipitates as a yellow oil (OH-number 0, residual acid number=8 (each mg KOH/g substance).

Phthalimido-N-(methylcarboxypropyl)-methacrylate (K).

1 mole of phthaloylglycine and 1 mole of hydroxypropyl-methacrylate are heated in 400 ml of toluene after the addition of 1 g of hydroquinone monomethylether and 1 g of concentrated sulfuric acid in a water separator, until approximately the theoretical quantity of water is separated. The toluene solution is washed with water and the toluene is drawn off by a vacuum.

$C_{16/18}$-fatty acid amido-ethylacrylate (L).

$C_{16/18}$a-fatty acid monoethanolamide.

0.5 mole of $C_{16/18}$-fatty acid methyl ester and 1 mole of 2-(methyl amino)-ethanol are mixed, 1% powdered tin is added and the mixture is heated for 6 hours at 150° C. Thereby approximately 80% of the theoretical methanol quantity is separated. Then the bath temperature is increased to 200° C. and placed under a vacuum for 30 minutes, to remove the remaining methanol as well as the excess aminoalcohol. A product with a melting point of 40° C. is obtained.

$C_{16/18}$-fatty acid amidoethyl acrylate:

1 mole of acrylic acid and 1 mole of the previously prepared $C_{16/18}$ fatty acid monoethanolamide together with 1 g of hydroquinone monomethylether and 1 g of concentrated sulfuric acid are placed in 300 ml of toluene and esterified for approximately 12 hours at 140° C. Then the solution is filtered and the toluene is extracted by a vacuum. The product obtained has a residual OH number of 15 and a residual acid number of 11.

Preparation of N-benzyl-N-methylaminoethylacrylate (M).

247.9 g (1.5 mole) of N-benzyl-N-methylethanolamine (commercial product) and 126.0 g (1.75 mole) of acrylic acid are heated in a water separator in 300 ml of xylene with the addition of 1.5 g of hydroquinone monomethylether and 1.5 g of concentrated sulfuric acid. After 6 hours 27 g of the water has been separated, which corresponds to a quantitative reaction. Towards the end of the reaction the internal temperature is increased to 170° C. by the removal of xylene. After the usual finishing processes a yellow-brown, highly fluid oil with an OH-number of 6.5 and an acid number of 9 mg KOH/g resulted.

3. Preparation of the copolymers of the invention.

The preparation of the copolymers of the invention are summarized in the following tables 2 to 9. Furthermore, in the column "Pour-Point", these tables contain the pour- points of a crude oil mixture which can be obtained by adding 400 ppm. of the copolymers of the invention, and which has a pour-point of +21° C. without any flow-improving additives.

EXAMPLE 1

Copolymers from (phthalimido-N-ethyl)acrylate (olefin A containing N) and behenylacrylate (approx. 70% $C_{22}$-content).

24.5 g (0.1 mole) of (phthalimido-N-ethyl)acrylate and 37.5 g (0.1 mole) of behenylacrylate are heated to 80° C. in 37.5 g of xylene. Then within one hour 0.46 g ($2.8 \times 10^{-3}$ mole) of azo-bis-isobutyronitrile AIBN) are added in 24.5 g of xylene. There is then a post-reaction time of 2 hours at 100° C.

EXAMPLES 2 to 20, 27, to 41, 44, 47, 50, 52

The preparation of these copolymers is carried out according to the method given in Example 1. The method is the Batch Method referred to in Tables 2-9.

EXAMPLES 21 to 26, 42, 43, 45, 46, 51 and 53

The preparation of the copolymers of the invention according to these examples is explained in the following using Example 24. This method is referred to as the Monomer Addition Procedure in Tables 2-9.

Preparation of (phthalimido-N-ethyl)-acrylate-behenylacrylate-polymers(by the monomer addition procedure).

A solution of 2.45 g (0.01 mole) (phthalimido-N-ethyl)-acrylate and 3.75 g (0.01 mole) of behenyl acrylate in 3.75 g of xylene (=10% of the monomer mixture) is added within 6 minutes at 80° C. to 0.046 AIBN in 2.45 g xylene (=10% of the starter solution). Within 54 minutes at the same temperature a 80° C., hot solution of 22.5 g (0.09 mole) (phthalimido-N-ethyl)-acrylate and 33.75 g (0.09 mole) behenylacrylate in 33.75 g of xylene and a solution of 0.414 g AIBN in 22.05 g xylene are added simultaneously. There was then a post-reaction period of 2 hours at 100° C.

The preparation of the remaining co-polymers synthesised by the Monomer Addition Procedure is carried out in a similar manner using the respective molar ratios given in the tables.

TABLE 2

Co-polymerizate in xylene at 80° C., "Batch Method", starter AIBN added.

| | Monomers | | | | Copolymerizate | |
| | | | | | Specific viscosity | |
| Example | N containing olefins | Mole | Fatty-alcohol acrylate | Mole | 10% in xylene, 25° C. | Pour-point [°C.] |
|---|---|---|---|---|---|---|
| 1 | A | 1 | behenylacrylate (~70% $C_{22}$) | 1 | 2.68 | −12 |
| 2 | E | 1 | behenylacrylate (~70% $C_{22}$) | 1 | 0.84 | −12 |
| 3 | C | 1 | behenylacrylate (~70% $C_{22}$) | 1 | 0.83 | −6 |
| 4 | G | 1 | behenylacrylate (~70% $C_{22}$) | 1 | 0.90 | −9 |
| 5 | D | 1 | behenylacrylate (~70% $C_{22}$) | 1 | 0.91 | −9 to −12 |
| 6 | H | 1 | behenylacrylate (~70% $C_{22}$) | 1 | 0.76 | −12 |
| 7 | B | 1 | behenylacrylate (~70% $C_{22}$) | 1 | 1.03 | −6 |
| 8 | I | 1 | behenylacrylate (~70% $C_{22}$) | 1 | 1.04 | −9 |
| 9 | F | 1 | behenylacrylate (~70% $C_{22}$) | 1 | 1.06 | −3 to −6 |

TABLE 3

Co-polymerizate in xylene at 80° C., "Batch Method", starter AIBN added.

| | Monomers | | | | Copolymerizate | |
| | | | | | Specific viscosity | |
| Example | N containing olefins | mole | Fatty-alcohol acrylate | mole | 10% in xylene, 25° C. | Pour-point [°C.] |
|---|---|---|---|---|---|---|
| 10 | I | 0.1 | Behenylacrylate (~70% $C_{22}$) | 1 | 1.04 | −12 to −15 |
| 11 | K | 0.1 | Behenylacrylate (~70% $C_{22}$) | 1 | 1.03 | −15 |

TABLE 4

Co-polymerization in xylene at 80° C., "Batch Method", starter AIBN added.

| | Monomers | | | | Copolymerizate | |
|---|---|---|---|---|---|---|
| | N containing | | Fatty-alcohol | | Specific viscosity 10% in xylene, | Pour-point |
| Example | olefins | mole | acrylate | mole | 25° C. | [°C.] |
| 12 | L | 1 | Behenylacrylate (~45% $C_{22}$) | 1 | 0.62 | −3 |
| 13 | L | 1 | Behenylacrylate (~45% $C_{22}$) | 0.5 | 0.54 | +3 |
| 14 | M | 0.1 | Behenylacrylate (~45% $C_{22}$) | 1 | 1.83 | −9 to −12 |

TABLE 5

Co-polymerizate in xylene at 80° C., "Batch Method", starter AIBN added.

| | Monomers | | | | Copolymerizate | |
|---|---|---|---|---|---|---|
| | N containing | | Fatty-alcohol | | Specific viscosity 10% in xylene, | Pour-point |
| Example | olefins | mole | acrylate | mole | 25° C. | [°C.] |
| 15 | A | 0.1 | Behenylacrylate (~70% $C_{22}$) | 1 | 2.95 | −9 |
| 16 | A | 0.33 | Behenylacrylate (~70% $C_{22}$) | 1 | 2.23 | −12 |
| 17 | A | 0.66 | Behenylacrylate (~70% $C_{22}$) | 1 | 4.02 | −15 |
| 18 | A | 1.0 | Behenylacrylate (~70% $C_{22}$) | 1 | 2.68 | −12 |
| 19 | A | 1.5 | Behenylacrylate (~70% $C_{22}$) | 1 | 2.62 | −6 |
| 20 | A | 3.0 | Behenylacrylate (~70% $C_{22}$) | 1 | 1.75 | +18 |

TABLE 6

Co-polymerizate in xylene at 80° C., "Monomer Addition Procedure", starter AIBN added.

| | Monomers | | | | Copolymerizate | |
|---|---|---|---|---|---|---|
| | N containing | | fatty-alcohol | | Specific viscosity 10% in xylene, | Pour-point |
| Example | olefins | mole | acrylate | mole | 25° C. | [°C.] |
| 21 | A | 0.1 | Behenylacrylate (70% $C_{22}$) | 1 | 1.72 | −12 |
| 22 | A | 0.33 | Behenylacrylate (70% $C_{22}$) | 1 | 1.50 | −12 |
| 23 | A | 0.66 | Behenylacrylate (70% $C_{22}$) | 1 | 1.47 | −12 |
| 24 | A | 1.0 | Behenylacrylate (70% $C_{22}$) | 1 | 1.22 | −9 |
| 25 | A | 1.5 | Behenylacrylate (70% $C_{22}$) | 1 | 1.18 | +3 |
| 26 | A | 3.0 | Behenylacrylate (70% $C_{22}$) | 1 | 1.06 | +18 |

TABLE 7

Co-polymerization in xylene, at 80° C., "Batch Method", starter AIBN added.

| | Monomers | | | | Copolymerizate | |
|---|---|---|---|---|---|---|
| | N containing | | fatty-alcohol | | Specific viscosity 10% in xylene, | Pour-point |
| Example | olefins | mole | acrylate | mole | 25° C. | [°C.] |
| 27 | A | 0.33 | Behenylacrylate (~45% $C_{22}$) | 1 | 2.49 | −15 |
| 28 | A | 0.66 | Behenylacrylate (~45% $C_{22}$) | 1 | 2.45 | −15 |
| 29 | A | 1.0 | Behenylacrylate (~45% $C_{22}$) | 1 | 1.84 | −12 |
| 30 | A | 0.33 | Behenylacrylate (~70% $C_{22}$) | 1 | 2.23 | −12 |
| 31 | A | 0.66 | Behenylacrylate (~70% $C_{22}$) | 1 | 4.02 | −15 |
| 32 | A | 1.0 | Behenylacrylate (~70% $C_{22}$) | 1 | 2.68 | −12 |
| 33 | A | 1.0 | Behenylacrylate (~70% $C_{22}$) | 1 | 2.21[1] | −3 to −6 |

TABLE 7-continued

Co-polymerization in xylene, at 80° C., "Batch Method", starter AIBN added.

| | Monomers | | | | Copolymerizate | |
|---|---|---|---|---|---|---|
| | | | | | Specific viscosity | |
| Example | N containing olefins | mole | fatty-alcohol acrylate | mole | 10% in xylene, 25° C. | Pour-point [°C.] |
| 34 | A | 1.0 | Behenylacrylate (~70% $C_{22}$) | 1 | 2.81[2] | −6 |
| 35 | A | 1.0 | Behenylacrylate (~70% $C_{22}$) | 1 | 1.70[3] | +6 |
| 36 | A | 1.0 | Behenylmethacrylate (~70% $C_{22}$) | 1 | 4.21 | +9 to +12 |
| 37 | A | 1.0 | Behenylacrylate (~98% $C_{22}$) | 1 | 2.08 | −3 |

[1, 2, 3]Regulator tert. dodecylmercaptan:
[1]$2 \cdot 10^{-4}$ mole/mole double bonds
[2]$1 \cdot 10^{-3}$ mole/mole double bonds
[3]$5 \cdot 10^{-3}$ mole/mole double bonds

TABLE 8

Co-polymerization, variations

| | Monomers | | Copolymerization Starter AIBN | | | | Copolymerization | | |
|---|---|---|---|---|---|---|---|---|---|
| Example | N containing olefin/ fatty alcohol-acrylate (1:1 mole) | Solvent | Mole/mole double bonds | Additive temperature [°C.] | Method 4 | Method 5 | Change [°C.] | Specific Viscosity 10% in xylene, 25° C. | Pour-point [°C.] |
| 38 | A Behenylacrylate (~70% $C_{22}$) | xylene | 0.014[1] | 80 | x | | 88 | 2.68 | −12 |
| 39 | A Behenylacrylate (~70% $C_{22}$) | xylene | 0.005 | 80 | x | | 79 | 1.34 | −9 |
| 40 | A Behenylacrylate (~70% $C_{22}$) | xylene | 0.025 | 80 | x | | 91 | 2.62 | −12 to −15 |
| 41 | A Behenylacrylate (~70% $C_{22}$) | xylene | 0.014 | 100 | x | | 84 | 1.77 | −12 to −15 |
| 42 | A Behenylacrylate (~70% $C_{22}$) | xylene | 0.014 | 80 | | x | 80 | 1.22 | −9 |
| 43 | A Behenylacrylate (~70% $C_{22}$) | xylene | 0.014 | 80[2] | | x | 87 | 1.54 | −12 to −15 |
| 44 | A Behenylacrylate (~70% $C_{22}$) | xylene | 0.014 | 90[3] | x | | 87 | 1.56 | −15 |
| 45 | A Behenylacrylate (~70% $C_{22}$) | tetralin | 0.014 | 80 | | x | 58 | 0.70 | +6 |
| 46 | A Behenylacrylate (~70% $C_{22}$) | Solvesso 200 | 0.014 | 80 | | x | 84 | 1.45 | −12 to −15 |

[1]Standard amount
[2]Addition time multiplied by four
[3]Addition time multiplied by eight
[4]Batch Method
[5]Monomer Addition Procedure

TABLE 9

Co-polymerization in xylene at 80° C., "Batch Method", starter AIBN added.

| | Monomers | | | | Copolymerizate | |
|---|---|---|---|---|---|---|
| | | | | | Specific viscosity | |
| Example | N containing olefins | mole | Fatty-alcohol acrylate | mole | 10% in xylene, 25° C. | Pour-point [25° C.] |
| 47 | M | 1.00 | Behenylacrylate (~45% $C_{22}$) | 1 | 0.72 | +12 |
| 48 | M | 0.66 | Behenylacrylate (~45% $C_{22}$) | 1 | 0.86 | +9 |
| 49 | M | 0.33 | Behenylacrylate (~45% $C_{22}$) | 1 | 1.04 | −12 to −15 |
| 50 | M | 0.15 | Behenylacrylate (~45% $C_{22}$) | 1 | 1.51 | −15 |
| 51 | M | 0.15 | Behenylacrylate (~45% $C_{22}$) | 1 | 1.18[1] | −6 |
| 52 | M | 0.15 | Behenylacrylate | 1 | 1.72 | −15 |
| 53 | M | 0.15 | Behenylacrylate | 1 | 1.39[1] | −15 |

[1]Monomer Addition Procedure

Table 10 contains test results with the compounds of the invention and a comparative product for crude oils important in practice.

TABLE 10

| Co-polymerizate Example No. (Each addition 400 ppm) | Tests on crude oils important in practice |||||
| --- | --- | --- | --- | --- | --- |
| | Crude oil types with varied pour-points |||||
| | PC 16* | PC 18* | Dry oil S* | La Paz** | La Conception** |
| 18 | −3 | <−18 | <−14 | +3 | +6 |
| 50 | +3 | <−18 | <−14 | <−20 | <−20 |
| Comparative Product | −3 | <−18 | <−14 | −9 | <−20 |
| Without Additive | +18 | +15 | +15 | +3 | +9 |

*Canada
**Venezuela

We claim:
1. A copolymer comprising units of:
(1) an acrylate of the formula I

$$CH_2=CR^1-CO-OR^2 \quad (I)$$

wherein $R^1$ is hydrogen or methyl, and $R^2$ is a linear or branched, saturated or unsaturated aliphatic radical having from 16 to 34 carbon atoms, and
(2) N-containing olefins selected from the group consisting of (A) a compound of the formula II $$R^3-R^4-O-CO-CR^5=CH_2 \quad (II)$$

wherein $R^3$ is a cyclic imide having of the formula III or IV

(III)

(IV)

wherein $R^5$ is hydrogen or methyl, $R^6$ and $R^7$ are together or separately hydrogen or $C_1$-$C_4$-alkyl groups or when taken together are ring fragments of an unsubstituted or a $C_1$-$C_4$ alkyl substituted ring having 5 or 6 carbon atoms, $R^4$ is (a) a straight-chain or branched alkylene group having 1 to 12 carbon atoms optionally sustituted with —OH or —$NH_2$ group, (b) a straight-chain or branched group having 1 to 12 carbon atoms containing the —$CH_2$—$CH_2$—O—$CH_2$—$CH_2$- or —$CH_2$—$CH_2$—NH—$CH_2$—$CH_2$- moiety when the alkylene group contains at least 4 carbon atoms, (c) a cyclic $C_5$- or $C_6$- alkylene group or (d) a $C_1$-$C_4$-alkylene- substituted phenylene group,
(B) a compound of formula V $$R^3-R^8-CO-OR^9-O-CO-CR^{10}=CH_2 \quad V$$

wherein $R^3$ is a cyclic imide having of the formula III or IV

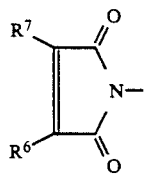

(III)

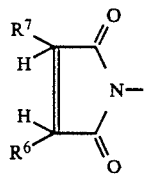

(IV)

wherein $R^6$ and $R^7$ are together or separately hydrogen or $C_1$-$C_4$-alkyl groups or when taken together are ring fragments of an unsubstituted or a $C_1$-$C_4$ alkyl substituted ring having 5 or 6 carbon atoms, $R^9$ is $C_2$-$C_{10}$ alkylene group, $R^{10}$ is hydrogen or methyl, $R^8$ is a phenylene radical or an alkylene group of the formula $$R^{20}-CH-$$

wherein $R^{20}$ is a hydrogen atom or a branched alkyl radical having from 1 to 11 carbon atoms, and $R^9$ is a $C_2$-$C_{10}$-alkylene group,
(C) a compound of formula VI

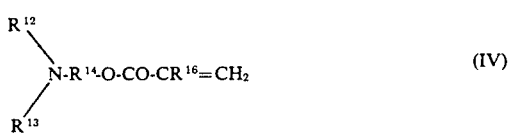

wherein $R^{16}$ is hydrogen or methyl, $R^{12}$ is a phenyl or benzyl group, $R^{13}$ is a $C_1$-$C_{16}$-alkyl group and $R^{16}$ is a $C_2$-$C_6$-alkylene group,
(D) a compound of formula VII $$R^{17}-CO-NH-R^{18}O-CO-CR^{19}=CH_2 \quad (VII)$$

wherein $R^{19}$ is hydrogen or methyl, $R^{17}$ is $C_7$–$C_{33}$-alkyl group, $R^{18}$ is a $C_2$–$C_4$-alkylene group or combinations thereof in molar ratios of I, to II, V, VI or VII of from about 1:0.1 to about 1:10.

2. A copolymer according to claim 1, wherein $R^1$ is hydrogen and $OR^2$ is a fatty alcohol radical with 16 to 24 carbon atoms.

3. A copolymer according to claim 1 or 2, wherein the compound of formula III is selected from the group consisting of phthalimide, methyl-tetrahydro-phthalimide, methyl-hexahydro-phthalimide, maleimide.

4. A copolymer according to claims 1 or 2, wherein the compound of formula IV is succinimide.

5. A copolymer according to claim 2 wherein $R^4$ is a straight-chain or branched alkylene group with 1 to 6 carbon atoms.

6. A copolymer according to claim 2 wherein $R^8$ is a methylene group.

7. A copolymer according to claim 2 wherein $R^8$ is a $C_1$–$C_5$-mono alkyl-substituted ethylene group.

8. A copolymer according to claim 2 wherein $R^9$ of is a $C_2$–$C_4$-alkylene group.

9. A copolymer according to claim 2 wherein $R^{12}$ is a phenyl or benzyl group, $R^{13}$ is a $C_1$–$C_4$-alkyl group, and $R^{14}$ is a $C_2$–$C_6$-alkylene group.

10. A copolymer according to claim 2 wherein $R^{12}$ and $R^{13}$ are $C_1$–$C_4$-alkyl groups and $R^{14}$ is a phenylene group.

11. A copolymer according to claim 2 wherein $R^{17}$ is a $C_{15}$–$C_{23}$-alkyl group.

12. A copolymer according to claim 1 wherein in a compound of formula I $R^1$ is hydrogen, $R^2$ is a linear or branched, saturated or unsaturated aliphatic radical having from 16 to 24 carbon atoms, and wherein in a compound of formula II $R^6$ and $R^7$ are together or separately hydrogen or $C_1$–$C_4$-alkyl groups or when taken together are ring fragments of an unsubstituted or a $C_1$–$C_4$ alkyl substituted ring having 5 or 6 carbon atoms, $R^4$ is (a) a straight-chain or branched alkylene group having 2 to 8 carbon atoms and wherein $R^3$ is a cyclic imide having of the formula III or IV

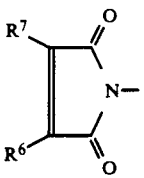

(III)

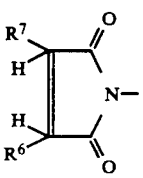

(IV)

said compounds of formula I and II being present in a molar ratio of from about 1:05 to about 1:2.

13. A copolymer according to claim 11 wherein in a compound of formula II $R^5$ is an alkyl radical having from 2 to 3 carbon atoms.

14. A copolymer according to claim 1 wherein in a compound of formula I $R^1$ is hydrogen, $R^2$ is a linear or branched, saturated or unsaturated aliphatic radical having from 16 to 24 carbon atoms, and wherein in a compound of formula VI $R^{12}$ is a benzyl group, $R^{13}$ is a $C_1$–$C_4$-alkyl group and $R^{14}$ is an ethylene group, said compounds of formula I and VI being present in a molar ratio of from about 1:0 to 1:0.5.

15. A copolymer according to claim 1 wherein said ring having 5 or 6 carbon atoms is selected from the group consisting of a cyclopentane ring, a cyclopentene ring, a $C_1$–$C_4$ alkyl substituted cyclopentane ring, a $C_1$–$C_4$ alkyl substituted cyclopentene ring, a benzene ring, a $C_1$–$C_4$ alkyl substituted benzene ring, a $C_1$–$C_4$ alkyl substituted 1,4-dihydrobenzene ring, a cyclohexane ring, a $C_1$–$C_4$ alkyl substituted cyclohexane ring, a cyclohexene ring, a $C_1$–$C_4$ alkyl substituted cyclohexene ring.

* * * * *